US010851805B2

(12) United States Patent
Thomson et al.

(10) Patent No.: US 10,851,805 B2
(45) Date of Patent: Dec. 1, 2020

(54) ACTUATOR ASSIST APPARATUS, ACTUATOR SYSTEM AND METHOD

(71) Applicant: GE Oil & Gas UK, Ltd., Bristol (GB)

(72) Inventors: Graeme Alexander Thomson, Vancouver (CA); Peter John Davey, Nailsea (GB)

(73) Assignee: GE OIL & GAS UK, LTD., Bristol (GB)

( * ) Notice: Subject to any disclaimer, the term of this patent is extended or adjusted under 35 U.S.C. 154(b) by 0 days.

(21) Appl. No.: 15/604,702

(22) Filed: May 25, 2017

(65) Prior Publication Data

US 2017/0343019 A1 Nov. 30, 2017

(30) Foreign Application Priority Data

May 25, 2016 (GB) .................................. 1609256.1

(51) Int. Cl.
| | |
|---|---|
| *F15B 1/24* | (2006.01) |
| *E21B 33/035* | (2006.01) |
| *F15B 1/027* | (2006.01) |
| *E21B 34/10* | (2006.01) |
| *E21B 33/064* | (2006.01) |

(52) U.S. Cl.
CPC ............ *F15B 1/24* (2013.01); *E21B 33/0355* (2013.01); *F15B 1/027* (2013.01); *E21B 33/064* (2013.01); *E21B 34/10* (2013.01); *F15B 2201/31* (2013.01)

(58) Field of Classification Search
CPC ......... F15B 3/00; F15B 11/032; E21B 33/064
See application file for complete search history.

(56) References Cited

U.S. PATENT DOCUMENTS

| | | | | |
|---|---|---|---|---|
| 4,095,421 A | * | 6/1978 | Silcox ................. | E21B 33/0355 137/236.1 |
| 6,192,680 B1 | * | 2/2001 | Brugman ............ | E21B 33/0355 60/398 |
| 7,424,917 B2 | | 9/2008 | Martin | |

(Continued)

FOREIGN PATENT DOCUMENTS

WO WO 2008056014 A1 * 5/2008 ................ F15B 3/00

OTHER PUBLICATIONS

Ali, S.Z., "Subsea Valve Actuator for Ultra Deepwater," Offshore Technology Conference, pp. 1-11 (May 6-9, 1996) (Abstract).

(Continued)

*Primary Examiner* — Michael Leslie
*Assistant Examiner* — Matthew Wiblin
(74) *Attorney, Agent, or Firm* — Baker Hughes Patent Organization

(57) ABSTRACT

An actuator assist apparatus for use with an actuator has a housing and a piston member slidably disposed in the housing. The piston member divides the interior of the housing into a first fluid chamber and a second fluid chamber. The actuator assist apparatus is configurable between a first, primed, configuration and an activated configuration. A force applicator is configured to store energy when the apparatus is in the primed configuration and release the energy to move the piston member relative to the housing. Movement of the piston member applies a force which assists in urging the actuator towards an extended configuration, thereby reducing the minimum operating pressure of the actuator.

20 Claims, 13 Drawing Sheets

(56) References Cited

U.S. PATENT DOCUMENTS

| | | |
|---|---|---|
| 7,520,129 B2 | 4/2009 | Springett |
| 8,291,938 B2 | 10/2012 | Kennedy et al. |
| 8,833,465 B2 | 9/2014 | Kotrla et al. |
| 9,140,090 B2 | 9/2015 | Van Wijk et al. |
| 2009/0178399 A1* | 7/2009 | Bishop ................ F15B 3/00 60/413 |
| 2010/0155072 A1* | 6/2010 | Gustafson ........... E21B 33/0355 166/335 |
| 2012/0205561 A1* | 8/2012 | Baugh ................. E21B 33/063 251/1.1 |
| 2016/0010418 A1* | 1/2016 | Van Wijk ............ E21B 33/0355 166/363 |

OTHER PUBLICATIONS

Wang, F., and Chen, Y., "Dynamic Characteristics of Pressure Compensator in Underwater Hydraulic System," IEEE/ASME Transactions on Mechatronics, vol. 19, Issue. 2, pp. 777-787 (May 15, 2013) (Abstract).

Search Report issued in connection with corresponding GB Application No. 1609256.1 dated Oct. 19, 2016.

* cited by examiner

ACTUATOR ASSIST APPARATUS, ACTUATOR SYSTEM AND METHOD

BACKGROUND

An actuator assist apparatus for use in subsea and downhole environments, an actuator system comprising the actuator assist apparatus and an actuation method.

Hydraulic accumulators are used in a vast array of applications and environments in order to perform operations. In marine and subsea environments, for example, hydraulic accumulators are used extensively to supply power for actuating subsea tooling, well closure equipment and the like.

However, there are a number of challenges associated with conventional hydraulic accumulator operation in subsea environments.

One such challenge is that as hydraulic accumulator systems are deployed to greater depths, the system efficiency decreases due to the increase in external hydrostatic pressure forces acting on the system. This primary loss of efficiency is due to the reduction in the ratio between the working pressure and the minimum operating pressure of an associated hydraulic device, such as a hydraulic actuator, which as depth increases approaches a ratio of 1:1.

In order to compensate for this loss in efficiency, accumulator quantities are increased to provide the required usable volume at greater depths. However, such systems suffer from a number of drawbacks. For example, accumulators typically have a large footprint such that increasing the amount of accumulator capacity significantly increases the space occupied by the system. Industry standards also place demands on the systems. For example, API 17G requires that systems possess accumulation volumes equal to or close to +25%. Industry also dictates specific shutdown times, such that some accumulator capacity must be provided on the subsea packages themselves.

The above notwithstanding, as deployment depth increases the 'usable volume' within the accumulators decreases, so that more accumulator bottles are needed to provide the required operation, redundancy and safety factors to maintain operation. At depths of 2000 meters and below the required accumulator capacity can become unmanageable.

SUMMARY OF THE INVENTION

According to one embodiment, there is provided an actuator assist apparatus for use with an actuator, the actuator assist apparatus comprising: a housing; a piston member moveably disposed in the housing; and a force application arrangement operatively associated with the piston member, the force application arrangement configured to release energy to move the piston member relative to the housing, movement of the piston member applying a force which assists in urging the actuator towards an extended configuration. The actuator assist apparatus may be configurable between a first, primed, configuration and a second, activated, configuration.

In the first, primed, configuration, the force application arrangement may store the energy to be released, this stored energy being released when the apparatus moves from the first, primed, configuration to the second, activated, configuration.

Beneficially, by applying a force on the actuator which assists in urging the actuator towards the extended configuration, the ratio between the working pressure and the minimum operating pressure is increased. The actuator assist apparatus may thus reduce the supply pressure required in order for the actuator to function effectively at greater depths, such as depths of 2000 meters or greater. By reducing the required supply pressure, the quantity of accumulators may be reduced, reducing space and weight occupied on subsea packages. Reduced requirement for accumulator capacity results in reduced capital and operational expenditure, reduced maintenance and testing requirements. Reducing the overall weight has the further effect that lifting equipment requirements are reduced. Moreover, by applying a force on the actuator which assists in urging the actuator towards the extended configuration embodiments of the present invention reduce the minimum operating pressure (MOP) of the actuator to below hydrostatic pressure. Embodiments of the present invention are thus particularly beneficial in marine, subsea and downhole applications which otherwise, due to external hydrostatic forces, lose efficiency due to the reduction in the ratio between the working pressure and the minimum operating pressure.

In use, the actuator assist apparatus may be coupled to the actuator and configured to exert a force on the actuator which assists in urging the actuator from a retracted configuration towards an extended configuration to perform an operation, such as a subsea well isolation operation or the like. By reducing the Minimum Operating Pressure of the actuator, the actuator assist apparatus permits efficient and reliable operation of the actuator, in particular in a subsea or downhole environment.

The actuator assist apparatus may be configured to exert a force on a piston member of the actuator ("the actuator piston").

The actuator assist apparatus may be configured to pull fluid from the actuator, such that the force required to move the actuator towards the extended configuration is reduced. In terms of forces acting on the actuator piston, operation of the actuator assist apparatus may have the effect of a pull force on the actuator piston urging the actuator piston towards the extended configuration. In use, movement of the piston member of the actuator assist apparatus may exert a pull force on fluid in the actuator which reduces a force acting to maintain the actuator in the retracted configuration.

The actuator assist apparatus may be configured to apply a push force on the actuator piston. For example, the piston member of the actuator assist apparatus may be coupled to the actuator piston, movement of the piston member of the actuator assist apparatus urging the actuator to the extended configuration.

The actuator assist apparatus may comprise a first fluid chamber.

In use, fluid pressure in the first fluid chamber may urge the actuator assist apparatus towards the first, primed, configuration.

The first fluid chamber of the actuator assist apparatus may communicate with a fluid supply. The fluid supply may comprise a hydraulic fluid supply. The actuator assist apparatus may comprise a second fluid chamber.

In use, fluid in the second fluid chamber of the actuator assist apparatus may urge the actuator assist apparatus towards the activated configuration.

The second fluid chamber of the actuator assist apparatus may communicate with the actuator. The second fluid chamber of the actuator assist apparatus may communicate with a fluid chamber of the actuator. Fluid in, or supplied to, the fluid chamber of the actuator in communication with the second fluid chamber of the actuator assist apparatus may urge the actuator towards a retracted position.

Fluid in the second fluid chamber may comprise hydraulic fluid. Fluid in the second fluid chamber may comprise water, such as seawater. Fluid in the second fluid chamber may comprise a gas. The first fluid chamber may be isolated from the second fluid chamber by the piston member of the actuator assist apparatus.

The piston member of the actuator assist apparatus may be disposed in the housing. In particular embodiments, the piston member is slidably disposed in the housing. The piston member of the actuator assist apparatus may be moveable in a first direction relative to the housing to urge the actuator towards the retracted configuration. The piston member of the actuator assist apparatus may be moveable in a second direction relative to the housing to urge the actuator towards the extended configuration.

In some embodiments, the actuator assist apparatus may comprise a piston rod. The piston rod of the actuator assist apparatus may extend from the housing of the actuator assist apparatus. The piston rod of the actuator assist apparatus may engage the actuator to apply the force to the actuator which assists in urging the actuator to the extended configuration. The force application arrangement may comprise a biasing member. The force application arrangement may comprise a spring arrangement. The force application arrangement may comprise one or more coil spring. The force application arrangement may be disposed in the housing. For example, the force application arrangement may be disposed in the second fluid chamber of the actuator assist apparatus. The force application arrangement may be coupled between the piston member and the housing.

The force application arrangement may be disposed outwith/outside the housing. For example, the force application arrangement may be coupled to the piston rod of the actuator assist apparatus.

The force application arrangement may be disposed in a third chamber. The third chamber may comprise a fluid chamber isolated from the first and second chambers of the actuator assist apparatus. The force application arrangement may comprise a fourth chamber. In use, the fourth chamber may be operatively associated with the third chamber. The fourth chamber may communicate with the third chamber. The fourth chamber may be directly coupled to the third chamber. Alternatively, the fourth chamber may be coupled to the third chamber by a fluid conduit, such as a hydraulic line.

The actuator assist apparatus may be provided in combination with the actuator to form an actuator system.

According to an embodiment, there is provided an actuator system comprising: an actuator for use in performing an operation; and an actuator assist apparatus according to one embodiment. The actuator may take a number of different forms.

The actuator may comprise a hydraulic actuator. The actuator system may comprise a single actuator. The actuator system may comprise a plurality of actuators. The actuator assist apparatus may be coupled to and/or operatively associated with, one of the plurality of actuators. Alternatively, the actuator assist apparatus may be coupled to and/or operatively associated with a plurality of the actuators.

The actuator may comprise an actuator housing.

The actuator may comprise a piston member ("the actuator piston"). The actuator piston may be moveably disposed in the actuator housing. The actuator piston may be slidably disposed in the actuator housing. The actuator piston may be moveable from a first, retracted, position relative to the actuator housing to a second, extended, position relative to the actuator housing by a supply pressure force acting on the actuator piston.

The actuator may comprise a first fluid chamber ("the actuator first fluid chamber"). Fluid in, or supplied to, the actuator first fluid chamber may urge the actuator towards the extended position.

The actuator may comprise a second fluid chamber ("the actuator second fluid chamber"). Fluid in, or supplied to, the actuator second fluid chamber may urge the actuator towards the retracted position. The actuator second fluid chamber may communicate with the actuator assist apparatus. For example, the actuator second fluid chamber may communicate with the second fluid chamber of the actuator assist apparatus.

The actuator may be coupled to the actuator assist apparatus by a conduit. The conduit may comprise a hydraulic line.

The actuator may communicate with the fluid supply. The actuator may be coupled to the fluid supply by a conduit. The conduit may comprise a hydraulic line.

The actuator system may comprise a fluid supply. The fluid supply may comprise an accumulator. In particular embodiments, the fluid supply may comprise a plurality of accumulators.

The system may comprise a valve arrangement. The valve arrangement may be interposed between the fluid supply and the actuator. The valve arrangement may be configured to provide selective fluid communication between the fluid supply and the actuator. The valve arrangement may be configured to vent fluid from the actuator.

The valve arrangement may be interposed between the fluid supply and the actuator assist apparatus. The valve arrangement may be configured to provide selective fluid communication between the fluid supply and the actuator assist apparatus. The valve arrangement may be configured to vent fluid from the actuator assist apparatus.

The valve arrangement may comprise a control valve arrangement. The valve arrangement may comprise a directional control valve. The valve arrangement may comprise a single directional control valve. The valve arrangement may comprise a plurality of directional control valves.

The system may comprise, or may be operatively associated with, a tool. The tool may comprise a subsea tool. The tool may comprise a downhole tool. The tool may comprise a workover and/or intervention tool. The tool may comprise a valve. The valve may comprise a subsea valve. The tool may comprise, or form part of, a well isolation system. The tool may comprise, or form part of, a safety head. The tool may comprise, or form part of, a blow out preventer. The tool may comprise, or form part of, an emergency disconnect package (EDP). The tool may comprise, or form part of, a lower riser package (LRP). The tool may comprise, or form part of, a lower marine riser package (LMRP). The tool may comprise, or form part of, a subsea tree. The tool may comprise, or form part of, a subsea test tree (SSTT). The tool may comprise, or form part of, a manifold. The tool may comprise, or form part of, a landing string. The tool may comprise, or form part of, a pump. The pump may comprise a linear rod pump (LRP), for example.

According to another embodiment, there is provided an actuation method comprising: providing an actuator assist apparatus comprising: a housing; a piston member moveably disposed in the housing; and a force application arrangement operatively associated with the piston member, the force application arrangement configured to release energy to move the piston member relative to the housing; coupling the actuator assist apparatus to an actuator; and activating the actuator assist apparatus by releasing energy from the force application arrangement to move the piston member relative to the housing, movement of the piston member applying a force which assists in urging the actuator towards an extended configuration.

Activating the actuator assist apparatus may comprise reducing a supply pressure to the actuator assist apparatus.

The method may comprise moving the actuator assist apparatus from a first, primed, configuration to a second, activated, configuration. In the primed configuration, the force application arrangement may define a retracted configuration. In moving to the activated configuration, the force application arrangement may move to an extended configuration.

The actuator assist apparatus may be activated by reducing the supply pressure to a level below that required to maintain the actuator assist apparatus in the primed configuration.

According to an additional embodiment, there is provided a subsea system comprising an apparatus according to one embodiment or a system according to an embodiment.

It should be understood that the features defined above or below may be utilized either alone or in combination with any other defined feature, in any other aspect or embodiment of the invention.

BRIEF DESCRIPTION OF THE DRAWINGS

These and other aspects will now be described, by way of example only, with reference to the accompanying drawings, in which.

DETAILED DESCRIPTION

Figure 1:
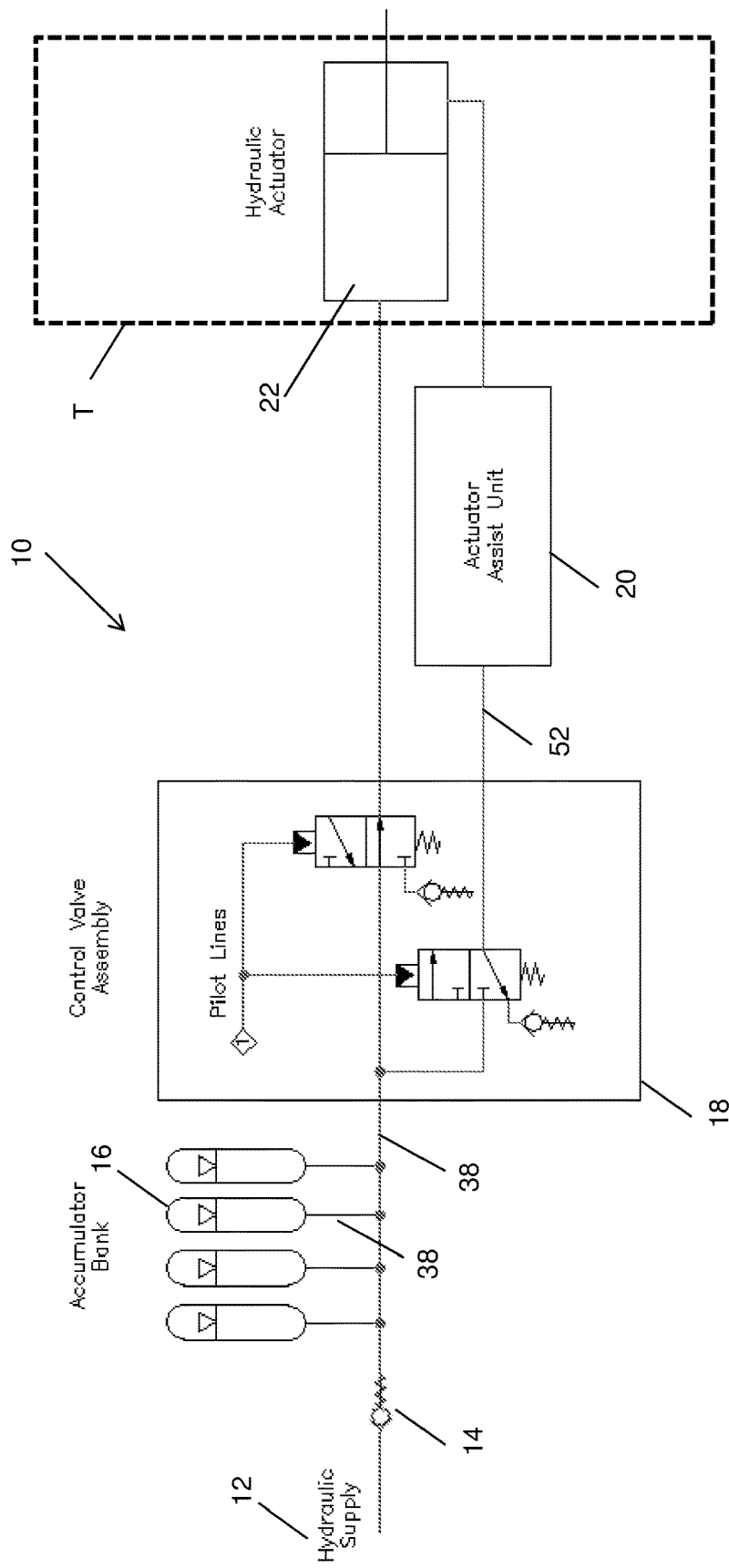
FIG. 1 shows a system according to an embodiment.

Referring first to FIG. 1 of the accompanying drawings, there is shown a schematic view of a system 10 according to one embodiment.

In use, the system 10 may form part of, or may be deployed in, a variety of different tools and equipment, including a safety head, a valve (in particular but not exclusively a subsea valve), a lower riser package (LRP), such as a lower marine riser package (LMRP), an Emergency Disconnect (EDP), a blow out preventer (BOP), a subsea tree, such as a subsea test tree (SSTT), a manifold, a landing string, a linear rod pump (LRP), or the like.

As shown in FIG. 1, the system 10 comprises a hydraulic fluid supply 12, a non-return valve 14, an accumulator 16 (in the illustrated embodiment a bank of accumulators), a control valve assembly 18, an actuator assist apparatus 20 and one or more actuator 22 forming part of, operatively associated with, or coupled to, a tool T. In use, the system 10 is operable to provide hydraulic power to operate the actuator 22, the actuator assist apparatus 20 reducing the hydraulic power required from the accumulator 16 to operate the actuator 22.

Beneficially, by reducing the power required from the accumulator 16 to urge the actuator 22 towards an extended configuration, the actuator assist apparatus 20 reduces the minimum operating pressure (MOP) of the actuator 22. Embodiments of the present invention are thus particularly beneficially in marine, subsea and downhole applications which otherwise, due to external hydrostatic forces, lose accumulator efficiency due to the reduction in the ratio between the working pressure and the minimum operating pressure.

Figure 2:
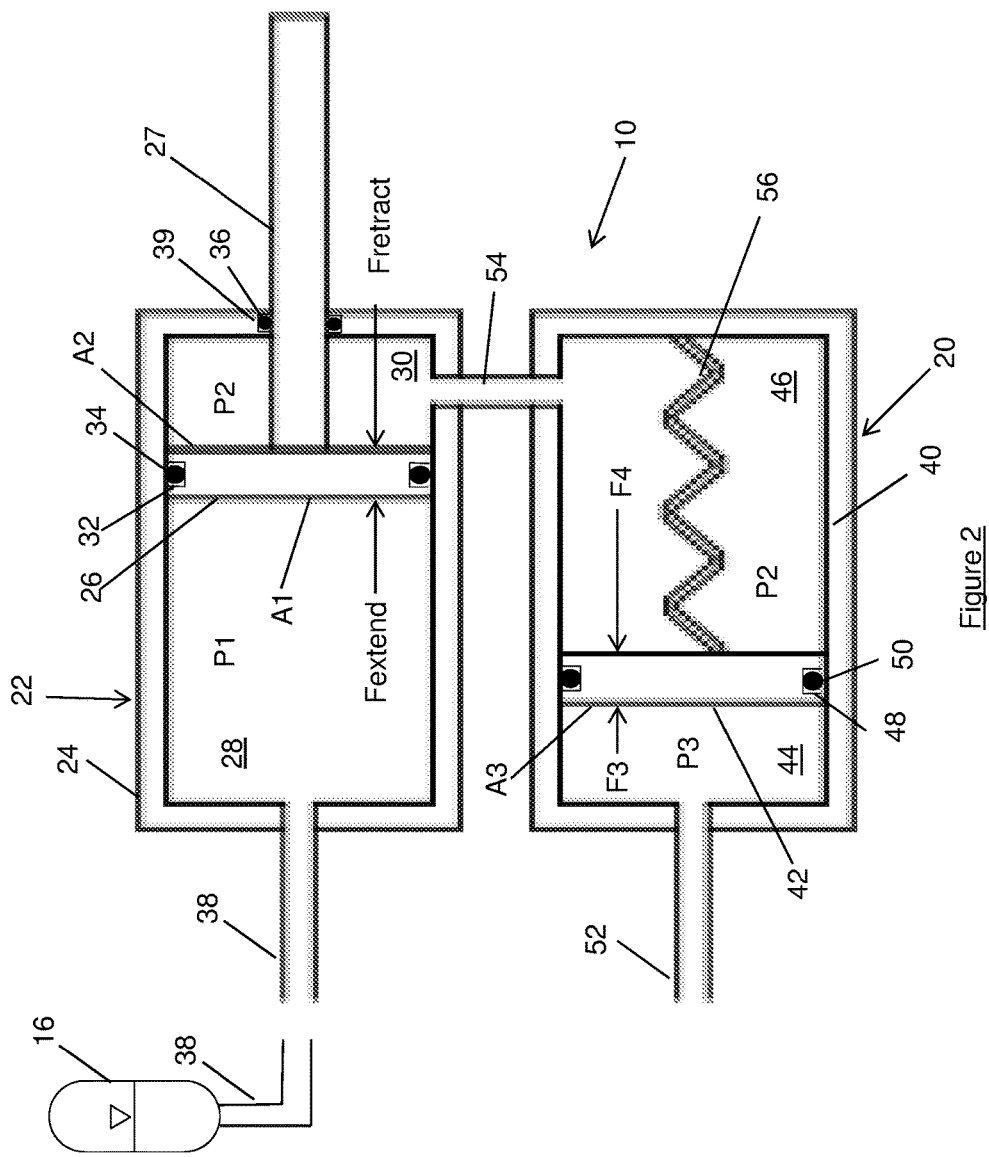
FIG. 2 shows an actuator assist apparatus suitable for use in the system shown in FIG. 1, in one configuration.

As shown in FIG. 2, the actuator 22 has a housing 24, a piston member 26 slidably disposed in the housing 24 and a piston rod 27 extending through the housing 24. The piston member 26 divides the interior of the housing 24 into a first fluid chamber 28 and a second fluid chamber 30. In the illustrated apparatus 20 shown in FIG. 2, an annular groove 32 is formed in the piston member 26 and a seal element 34 is disposed in the groove 32. In use, the piston member 26 isolates the first fluid chamber 28 from the second fluid chamber 30. In the illustrated apparatus 20, the seal element 34 comprises an o-ring seal element. However, it will be recognized that other suitable sealing arrangements may be used to isolate the first fluid chamber 28 from the second fluid chamber 30. A gland seal 36 is disposed in a groove 39 formed in the housing 24. In use, the gland seal 36 provides a seal between the piston rod 27 and the housing 24.

As shown in FIGS. 1 and 2, the first fluid chamber 28 communicates with the hydraulic fluid supply 12 and accumulator 16 via conduits 38, in the illustrated embodiment the conduits 38 taking the form of hydraulic lines. The second fluid chamber 30 communicates with the actuator assist apparatus 20, as will be described further below.

In use, the actuator 22 is moveable between a retracted configuration (shown in FIG. 3) and an extended configuration (shown in FIG. 5) by virtue of a differential pressure force Fdelta acting on the piston member 26, where the differential pressure force Fdelta equals the difference between a force Fextend urging the actuator 22 towards the extended configuration and which results from the fluid pressure P1 in the first fluid chamber 28 multiplied by area A1 of the piston member 26 exposed to the pressure P1 and a force Fretract urging the actuator 22 towards the retracted configuration and which results from the fluid pressure P2 in the second fluid chamber 30 multiplied by annular area A2 of the piston member 26 exposed to the pressure P2.

The differential pressure force Fdelta acting on the piston member 26 can thus be expressed as:

$$F\text{delta} = F\text{extend} - F\text{retract}, \text{ where } F\text{extend} = P1/A1, F\text{retract} = P2/A2$$

The actuator assist apparatus 20 has a housing 40 and a piston member 42 slidably disposed in the housing 40. The piston member 42 divides the interior of the housing 40 into a first fluid chamber 44 and a second fluid chamber 46. In use, the piston member 42 isolates the first fluid chamber 42 from the second fluid chamber 44. In the illustrated embodiment shown in FIG. 2, an annular groove 48 is formed in the piston member 42 and a seal element 50 is disposed in the groove 48. In the illustrated apparatus 20, the seal element 50 comprises an o-ring seal element. However, it will be recognized that other suitable sealing arrangements may be used to isolate the first fluid chamber 44 from the second fluid chamber 46, or no sealing arrangement may be provided between the first fluid chamber 44 and the second fluid chamber 46 of the actuator assist apparatus 20.

As shown in FIG. 2, the actuator assist apparatus 20 is coupled to the actuator 22. The first fluid chamber 44 of the actuator assist apparatus 20 communicates with the fluid supply 12 via a conduit 52, in the illustrated embodiment the conduit 52 taking the form of a hydraulic line. The second fluid chamber 46 of the actuator assist apparatus 20 communicates with the second fluid chamber 30 of the actuator 22 via conduit 54, which in the illustrated embodiment also takes the form of a hydraulic line.

Figure 3:
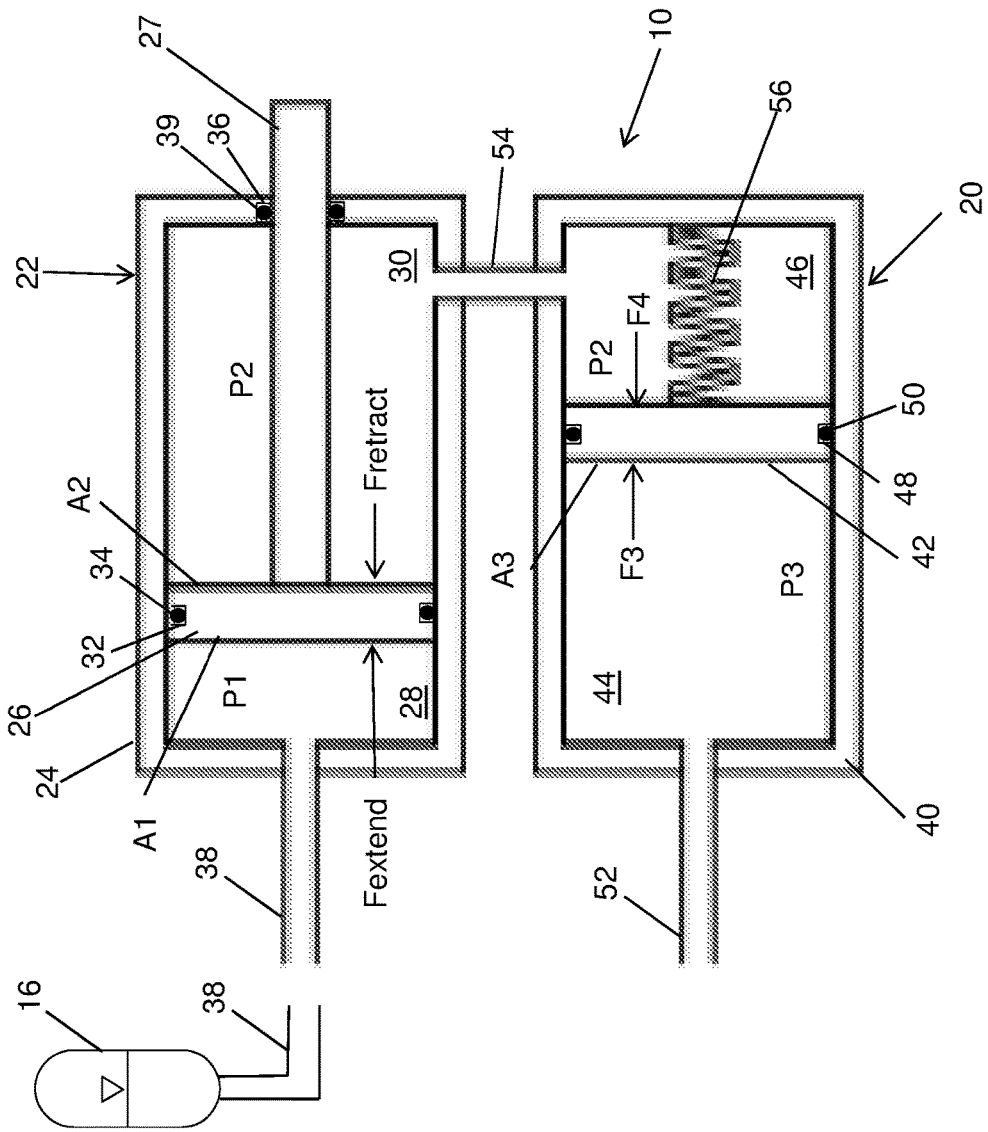
FIG. 3 shows the actuator assist apparatus shown in FIG. 2, in a primed configuration.
Figure 4:
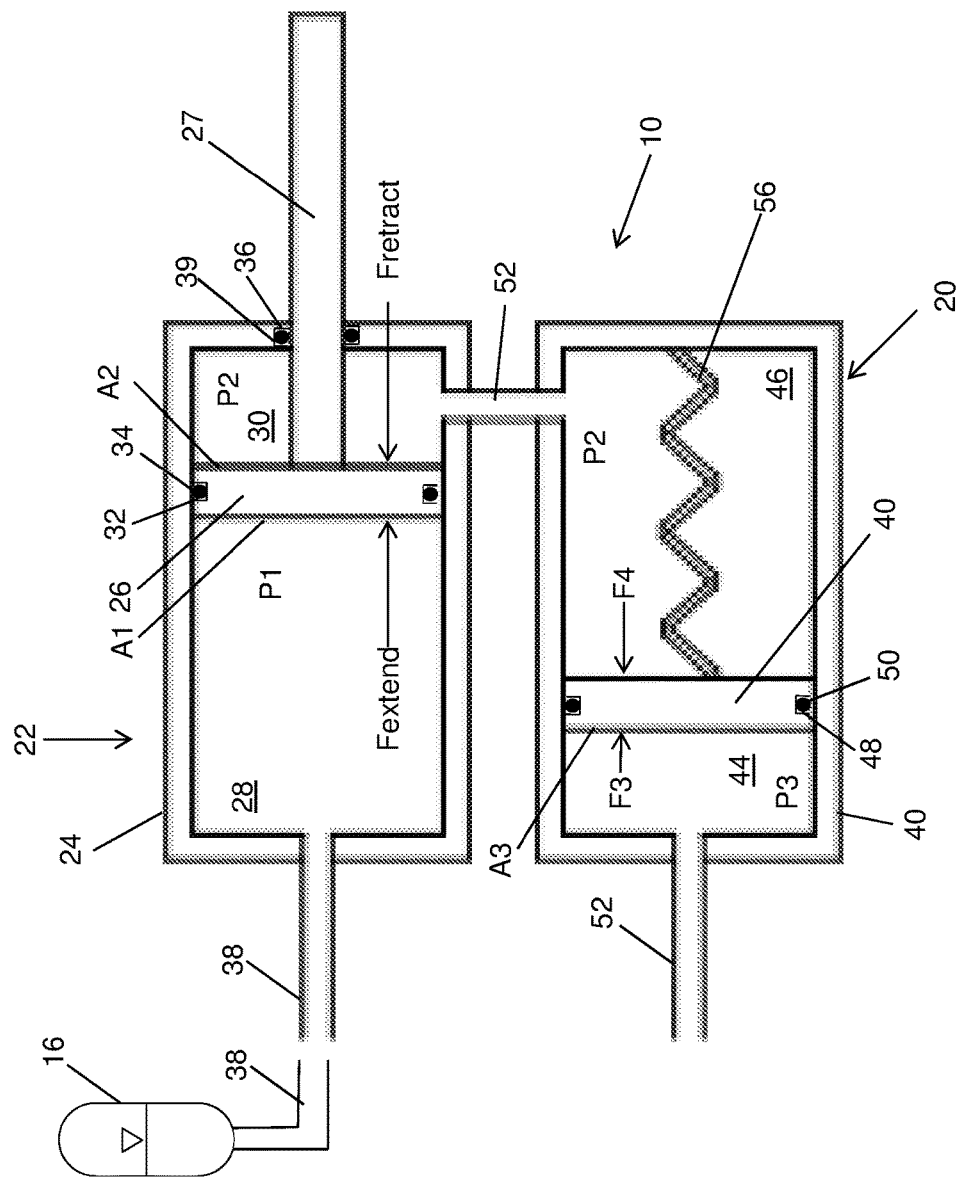
FIG. 4 shows the actuator assist apparatus shown in FIGS. 2 to 3, showing the actuator in an extended configuration.
Figure 5:
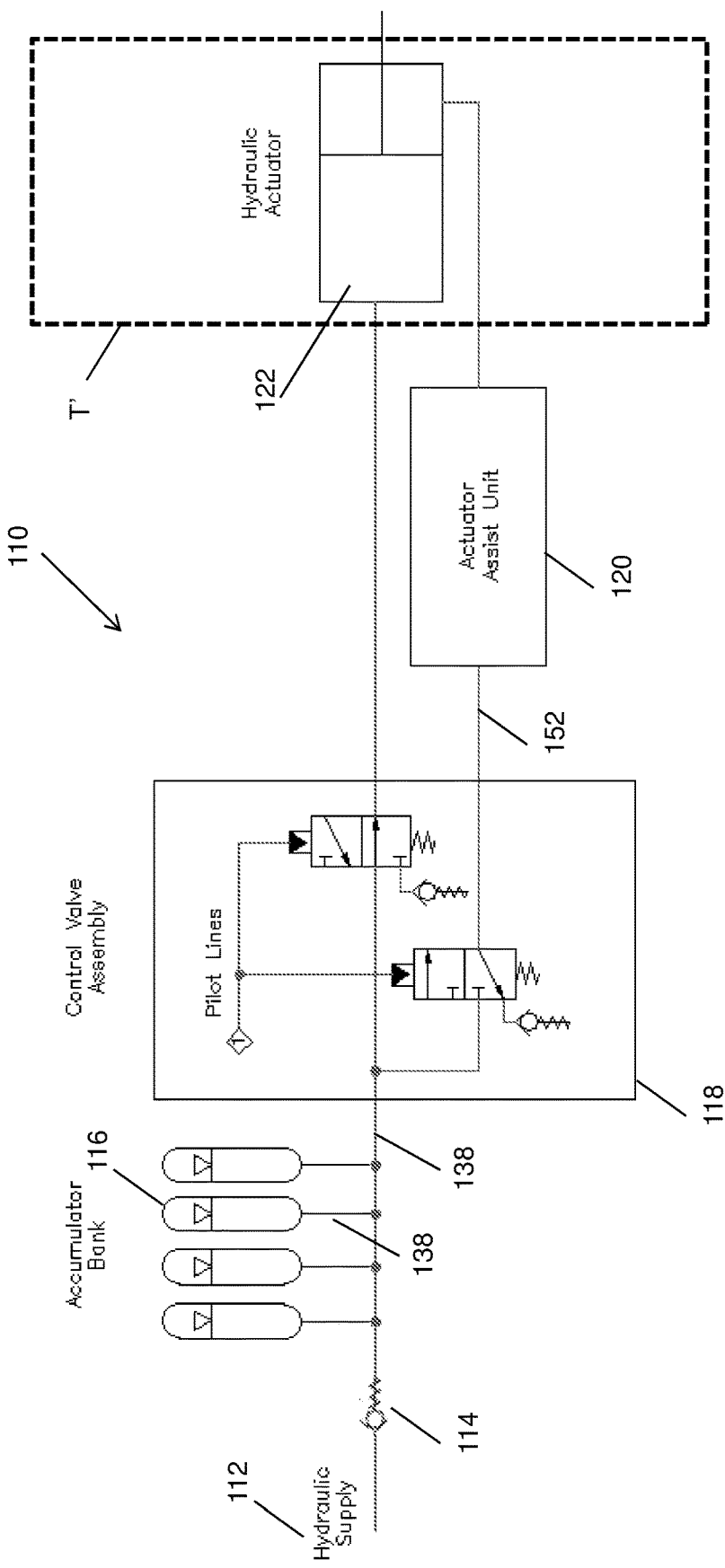
FIG. 5 shows a system according to one embodiment.

The actuator assist apparatus 20 is configurable between a first, primed, configuration (as shown in FIG. 3) and an activated configuration (as shown in FIGS. 4 and 5). In use, movement of the actuator assist apparatus 20 to the activated configuration draws or pulls fluid from the second fluid chamber 30 of the actuator 22 into the second fluid chamber 46 of the actuator assist apparatus 20, reducing the force Fretract urging the actuator 22 towards the retracted configuration and thereby reducing the supply pressure P1 required to move the actuator 12 to the extended configuration.

As shown in FIG. 2, the actuator assist apparatus 20 further comprises a force applicator 56. In the illustrated embodiment, the force applicator 56 comprises a coil spring, although other force application arrangements may be utilized where appropriate. In the illustrated embodiment, the force applicator 56 is disposed in the second fluid chamber 46 of the actuator assist apparatus 20 and is coupled at a first end to the piston member 42 of the actuator assist apparatus 20 and at a second end to the housing 40 of the actuator assist apparatus 20. The force applicator 56 is biased towards an extended position and so biases the actuator assist apparatus 20 towards its activated configuration in which fluid is drawn from the second fluid chamber 30 of the actuator 22 into the second fluid chamber 46 of the actuator assist apparatus 20.

Operation of the system 10 will now be described with reference to FIG. 1 and also to FIGS. 2 to 5 of the accompanying drawings.

The system 10 is first primed by moving the actuator 22 to the retracted configuration and moving the actuator assist apparatus 20 to the primed configuration. This is achieved by reducing/venting the supply pressure P1 in the first fluid chamber 28 of the actuator 22 and/or increasing the pressure P3 in the first fluid chamber 44 of the actuator assist apparatus 20, causing the piston member 42 of the actuator assist apparatus 20 to move relative to the housing 40 and compressing the force applicator 56 which in turn forces fluid from the second fluid chamber 46 into the second fluid chamber 30 of the actuator 22. As the fluid moves into the actuator 22, the piston member 26 of the actuator 22 is moved (to the left as shown in the drawings), transitioning the actuator 12 to the retracted configuration, as shown in FIG. 2.

When a command to move the actuator 22 to the extended configuration is initiated, the supply pressure P3 in the first fluid chamber 44 of the actuator assist apparatus 20 is reduced or vented, for example to the surrounding environment. As the pressure P3 in the first fluid chamber 44 of the actuator assist apparatus 20 reduces, the force F3 exerted on the piston member 42—which is equal to the pressure P3 multiplied by area A3 of piston member 42—and which acts to maintain the actuator assist apparatus 20 in the primed configuration reduces until it is drops below the force F4 exerted by the force applicator 56, moving the piston member 42 from the position shown in FIG. 3 to the position shown in FIG. 4 and transitioning the actuator assist apparatus 20 to the activated configuration. Movement of the piston member 42 draws fluid from the second fluid chamber 30 of the actuator 22, reducing the pressure within the second fluid chamber, and thereby reducing the minimum operating pressure needed to operate the actuator 22 as supplied by the accumulator 16.

It should be understood that the embodiments described herein are merely exemplary and that various modifications may be made thereto without departing from the scope of the invention.

Figure 6:
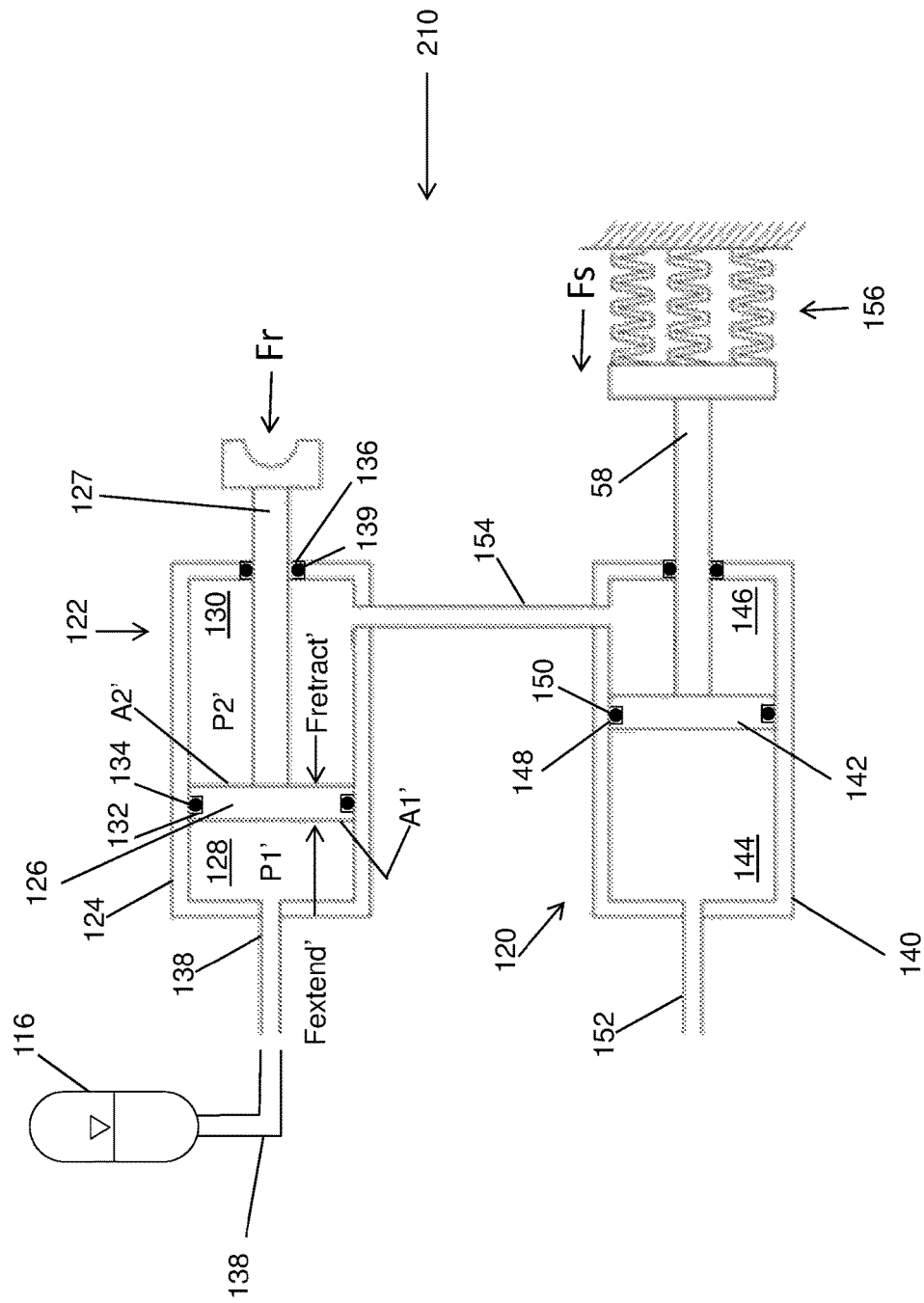
FIG. 6 shows an actuator assist apparatus suitable for use in the system shown in FIG. 7.

For example, FIGS. 5 and 6 of the accompanying drawings show a system 110 according to an embodiment.

The actuator system 110 is similar to the actuator system 10 described above and like components are represented by like numerals incremented by 100.

As in the system 10, the system 110 comprises a hydraulic fluid supply 112, a non-return valve 114, an accumulator 116 (in the illustrated embodiment a bank of accumulators), a control valve assembly 118, an actuator assist apparatus 120 and one or more actuator 122 forming part of, operatively associated with, or coupled to, a tool T'. In use, the system 110 is operable to provide hydraulic power to operate the actuator 122, the actuator assist apparatus 120 reducing the hydraulic power required from the accumulator 116 to operate the actuator 122.

Beneficially, by reducing the power required from the accumulator 116 to urge the actuator 122 towards an extended configuration, the actuator assist apparatus 120 reduces the minimum operating pressure (MOP) of the actuator 122. Embodiments of the present invention are thus particularly beneficially in marine, subsea and downhole applications which otherwise, due to external hydrostatic forces, lose accumulator efficiency due to the reduction in the ratio between the working pressure and the minimum operating pressure.

As shown in FIG. 6, the actuator 122 has a housing 124, a piston member 126 slidably disposed in the housing 124 and a piston rod 127 extending through the housing 124. The piston member 126 divides the interior of the housing 124 into a first fluid chamber 128 and a second fluid chamber 130.

In a similar construction to that described above with respect to FIGS. 2 to 4, in the embodiment shown in FIGS. 5 and 6 an annular groove 132 is formed in the piston member 126 and a seal element 134 is disposed in the groove 132. In use, the piston member 126 isolates the first fluid chamber 128 from the second fluid chamber 130. In the illustrated apparatus 120, the seal element 134 comprises an o-ring seal element. However, it will be recognized that other suitable sealing arrangements may be used to isolate the first fluid chamber 128 from the second fluid chamber 130. A gland seal 136 is disposed in a groove 139 formed in the housing 124. In use, the gland seal 136 provides a seal between the piston rod 127 and the housing 124.

As shown in FIG. 6, the first fluid chamber 128 communicates with the fluid supply 112 and accumulator 116 via conduits 138, in the illustrated embodiment the conduits 138 taking the form of hydraulic lines. The second fluid chamber 128 communicates with the actuator assist apparatus 220, as will be described further below.

In use, the actuator 122 is moveable between a retracted configuration and an extended configuration by virtue of a differential pressure force Fdelta' acting on the piston member 126, where the differential pressure force Fdelta' equals the difference between a force Fextend' urging the actuator 122 towards the extended configuration and which results from the fluid pressure P1' in the first fluid chamber 128 multiplied by area A1' of the piston member 126 exposed to the pressure P1' and a force Fretract' urging the actuator 122 towards the retracted configuration and which results from the fluid pressure P2' in the second fluid chamber 130 multiplied by annular area A2' of the piston member 126 exposed to the pressure P2'.

In this embodiment, the differential pressure force Fdelta' acting on the piston member 126 can thus be expressed as:

$$F\text{delta}' = F\text{extend}' - F\text{retract}', \text{ where } F\text{extend}' = P1'/A1', F\text{retract}' = P2'/A2'$$

The actuator assist apparatus 120 has a housing 140 and a piston member 142 slidably disposed in the housing 140. The piston member 142 divides the interior of the housing 140 into a first fluid chamber 144 and a second fluid chamber 146.

As in the previous embodiment, an annular groove 148 is formed in the piston member 142 and a seal element 150 is disposed in the groove 148. In the illustrated apparatus 120, the seal element 150 comprises an o-ring seal element. In use, the piston member 142 isolates the first fluid chamber 144 from the second fluid chamber 146. However, it will be recognized that other suitable sealing arrangements may be used to isolate the first fluid chamber 144 from the second fluid chamber 146, or no sealing arrangement may be provided between first fluid chamber 144 and the second fluid chamber 146 of the actuator assist apparatus 120.

The actuator assist apparatus 120 is coupled to the actuator 122. The first fluid chamber 144 of the actuator assist apparatus 120 communicates with the fluid supply 112 via a conduit 152, in the illustrated embodiment the conduit 152 taking the form of a hydraulic line. The second fluid chamber 146 of the actuator assist apparatus 120 communicates with the second fluid chamber 130 of the actuator 122 via conduit 154, which in the illustrated system takes the form of a hydraulic line.

As in the previously described embodiment, the actuator assist apparatus 120 is configurable between a first, primed, configuration and an activated configuration. In use, movement of the actuator assist apparatus 120 to the activated configuration draws or pulls fluid from the second fluid chamber 130 of the actuator 122 into the second fluid chamber 146 of the actuator assist apparatus 120, reducing the force Fretract' urging the actuator 122 towards the retracted configuration and thereby reducing the supply pressure P1' required to move the actuator 122 to the extended configuration.

The actuator assist apparatus 120 further comprises a force applicator 156. In the illustrated system, the force applicator 156 comprises a force application arrangement comprising a plurality of coil springs (three springs are shown in the illustrated system), although other force application arrangements may be utilized where appropriate. In this system, however, the force application arrangement 156 is disposed outwith or outside the housing 140, the force application arrangement 156 coupled to the piston member 142 by a piston rod 58. The force application arrangement 156 is biased towards an extended position and so biases the actuator assist apparatus 120 towards its activated configuration in which fluid is drawn from the second fluid chamber 130 of the actuator 122 into the second fluid chamber 142 of the actuator assist apparatus 120, in a similar manner to that described above with respect to the actuator system 10 shown in FIGS. 1 to 4.

Figure 7:
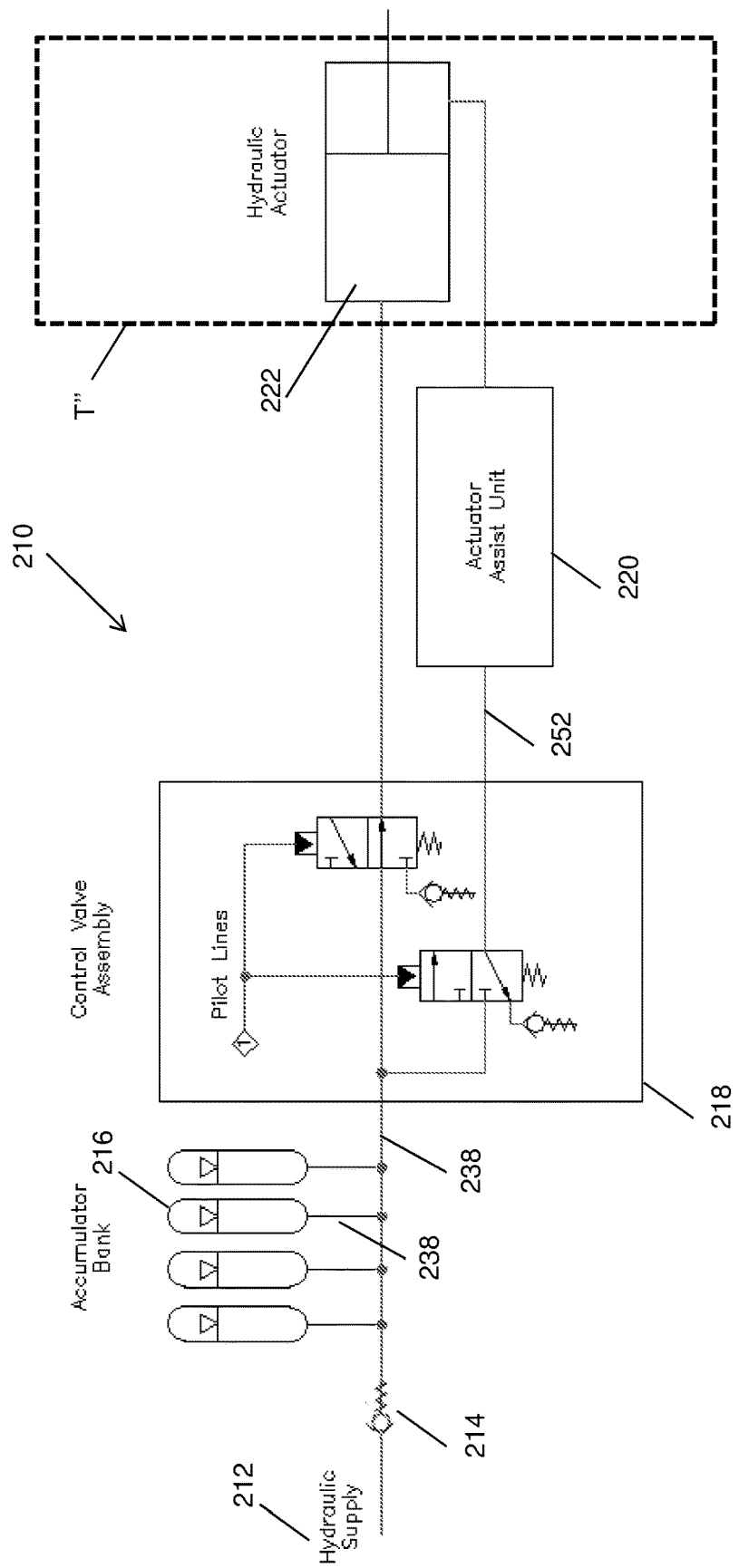
FIG. 7 shows a system according to one embodiment.
Figure 8:
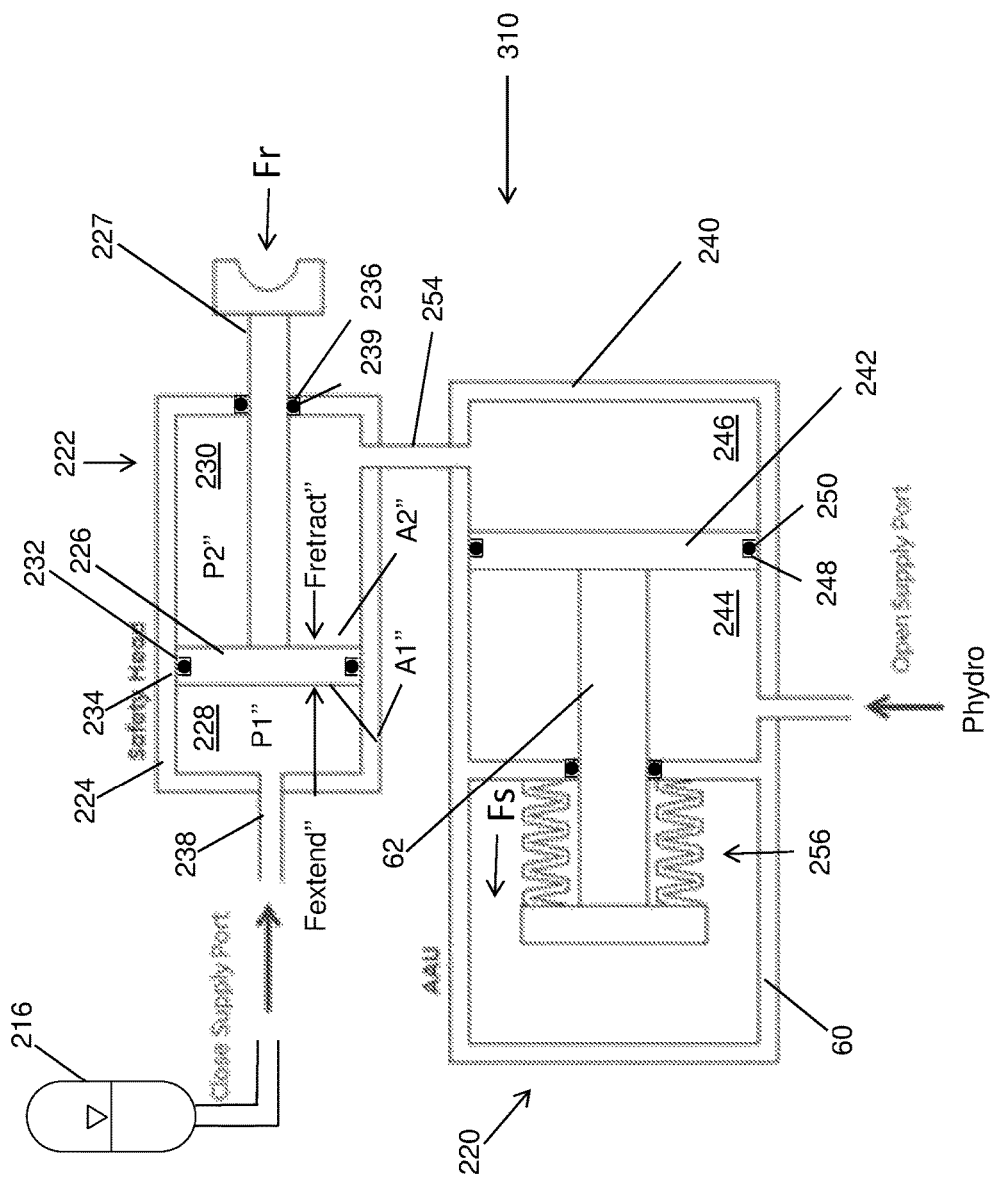
FIG. 8 shows an actuator assist apparatus suitable for use in the system shown in FIG. 7.

Referring now to FIGS. 7 and 8 of the accompanying drawings, there is shown an actuator system 210 according to a third embodiment.

The actuator system 210 is similar to the actuator system 10 described above and like components are represented by like numerals incremented by 200.

As in the system 10, the system 210 comprises a hydraulic fluid supply 212, a non-return valve 214, an accumulator 216 (in the illustrated embodiment a bank of accumulators), a control valve assembly 218, an actuator assist apparatus 220 and one or more actuator 222 forming part of, operatively associated with, or coupled to, a tool T". In use, the system 210 is operable to provide hydraulic power to operate the actuator 222, the actuator assist apparatus 220 reducing the hydraulic power required from the accumulator 216 to operate the actuator 222.

Beneficially, by reducing the power required from the accumulator 216 to urge the actuator 222 towards an extended configuration, the actuator assist apparatus 220 reduces the minimum operating pressure (MOP) of the actuator 222. Embodiments of the present invention are thus particularly beneficially in marine, subsea and downhole applications which otherwise, due to external hydrostatic forces, lose accumulator efficiency due to the reduction in the ratio between the working pressure and the minimum operating pressure.

As shown in FIG. 8, the actuator 222 has a housing 224, a piston member 226 slidably disposed in the housing 224 and a piston rod 227 extending through the housing 224. The piston member 226 divides the interior of the housing 224 into a first fluid chamber 228 and a second fluid chamber 230.

In a similar construction to that described above with respect to FIGS. 1 to 4, in the system 210 shown in FIG. 8 an annular groove 232 is formed in the piston member 226 and a seal element 234 is disposed in the groove 232.

In use, the piston member 226 isolates the first fluid chamber 228 from the second fluid chamber 230. In the illustrated system 210, the seal element 234 comprises an o-ring seal element. However, it will be recognized that other suitable sealing arrangements may be used to isolate the first fluid chamber 228 from the second fluid chamber 230, or no sealing arrangement may be provided. A gland seal 236 is disposed in a groove 239 formed in the housing 224. In use, the gland seal 236 provides a seal between the piston rod 227 and the housing 224.

As shown in FIG. 8, the first fluid chamber 228 communicates with the fluid supply 212 and accumulator 216 via conduits 238, in the illustrated embodiment the conduits 238 taking the form of hydraulic lines. The second fluid chamber 230 communicates with the actuator assist apparatus 220, as will be described further below.

In use, the actuator 222 is moveable between a retracted configuration and an extended configuration by virtue of a differential pressure force Fdelta" acting on the piston member 226, where the differential pressure force Fdelta" equals the difference between a force Fextend" urging the actuator 222 towards the extended configuration and which results from the fluid pressure P1" in the first fluid chamber 228 multiplied by area A1" of the piston member 226 exposed to the pressure P1" and a force Fretract" urging the actuator 222 towards the retracted configuration and which results from the fluid pressure P2″ in the second fluid chamber 230 multiplied by annular area A2″ of the piston member 226 exposed to the pressure P2″.

In this embodiment, the differential pressure force Fdelta″ acting on the piston member 226 can thus be expressed as:

$$F\text{delta}''=F\text{extend}''-F\text{retract}'', \text{ where } F\text{extend}''=P1''/A1'', F\text{retract}''=P2''/A2''$$

In this embodiment, the actuator assist apparatus 220 has a housing 240 and a piston member 242 slidably disposed in the housing 240. The piston member 242 divides the interior of the housing 240 into a first fluid chamber 244 and a second fluid chamber 246. As in previous embodiments, an annular groove 248 is formed in the piston member 242 and a seal element 250 is disposed in the groove 248. In the illustrated system 210, the seal element 250 comprises an o-ring seal element. In use, the piston member 242 isolates the first fluid chamber 244 from the second fluid chamber 246. However, it will be recognized that other suitable sealing arrangements may be used to isolate the first fluid chamber 244 from the second fluid chamber 246, or no sealing arrangement may be provided.

The actuator assist apparatus 220 is coupled to the actuator 222. In this embodiment, the first fluid chamber 244 communicates with hydrostatic pressure Phydro of the surrounding environment. The second fluid chamber 246 communicates with the second fluid chamber 230 of the actuator 222 via conduit 254, which in the illustrated embodiment takes the form of a hydraulic line.

As in previous embodiments, the actuator assist apparatus 220 is configurable between a first, primed, configuration and an activated configuration. In use, movement of the actuator assist apparatus 220 to the activated configuration draws or pulls fluid from the second fluid chamber 230 of the actuator 222 into the second fluid chamber 246 of the actuator assist apparatus 220, reducing the force Fretract″ urging the actuator 222 towards the retracted configuration and thereby reducing the supply pressure P1″ from the accumulators 216 required to move the actuator 222 to the extended configuration.

The actuator assist apparatus 220 further comprises a force applicator 256. In the illustrated embodiment, the force applicator 256 comprises a force application arrangement comprising a plurality of coil springs (two springs are shown in the illustrated embodiment), although other force application arrangements may be utilized where appropriate. In this embodiment, however, the force application arrangement 256 is disposed within a third chamber 60 coupled to or forming part of the housing 240, the force application arrangement 256 coupled to the piston member 242 by a piston rod 62. The force application arrangement 256 is biased towards an extended position and so biases the actuator assist apparatus 220 towards its activated configuration in which fluid is drawn from the second fluid chamber 230 of the actuator 220 into the second fluid chamber 246 of the actuator assist apparatus 220, in a similar manner to that described above with respect to the actuator system 10 shown in FIGS. 1 to 4.

As described above, embodiments described herein are merely exemplary and various modifications may be made thereto without departing from the scope of the invention.

Figure 9:
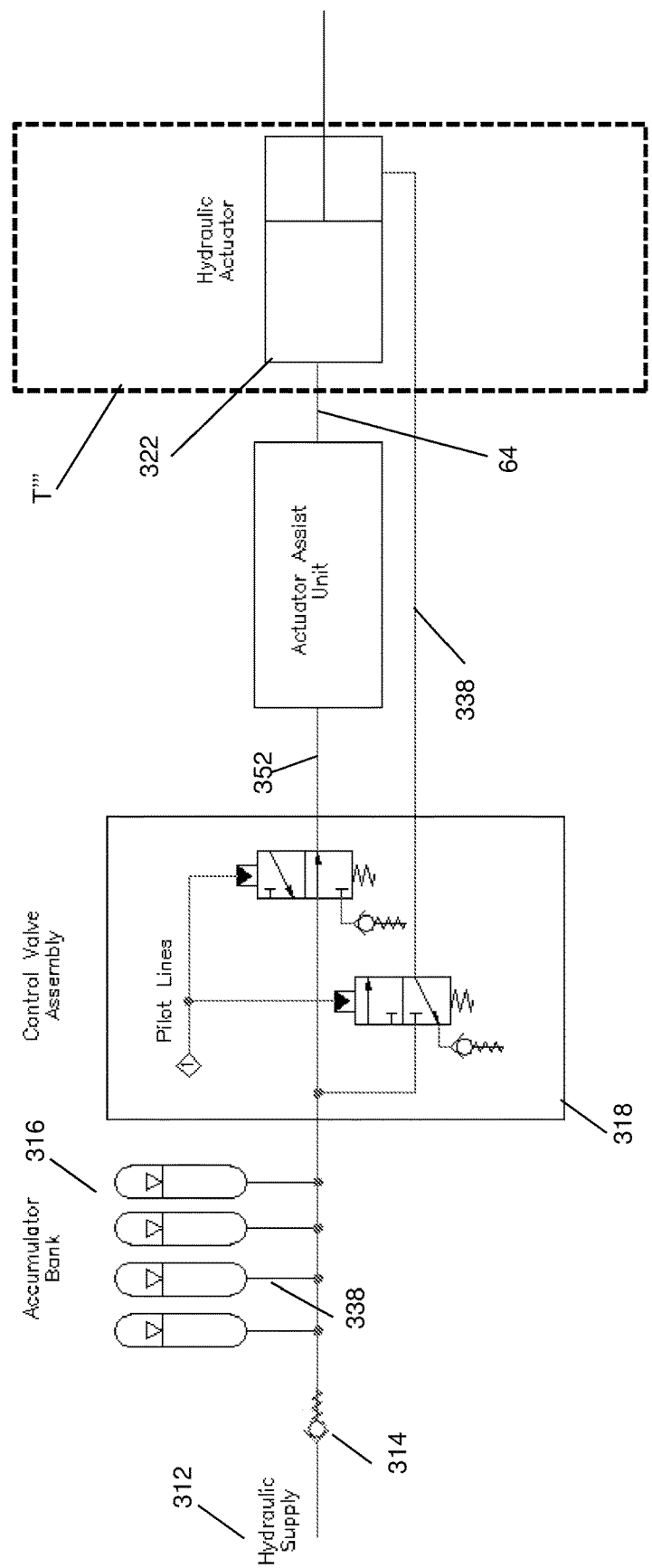
FIG. 9 shows a system according to an embodiment.
Figure 10:
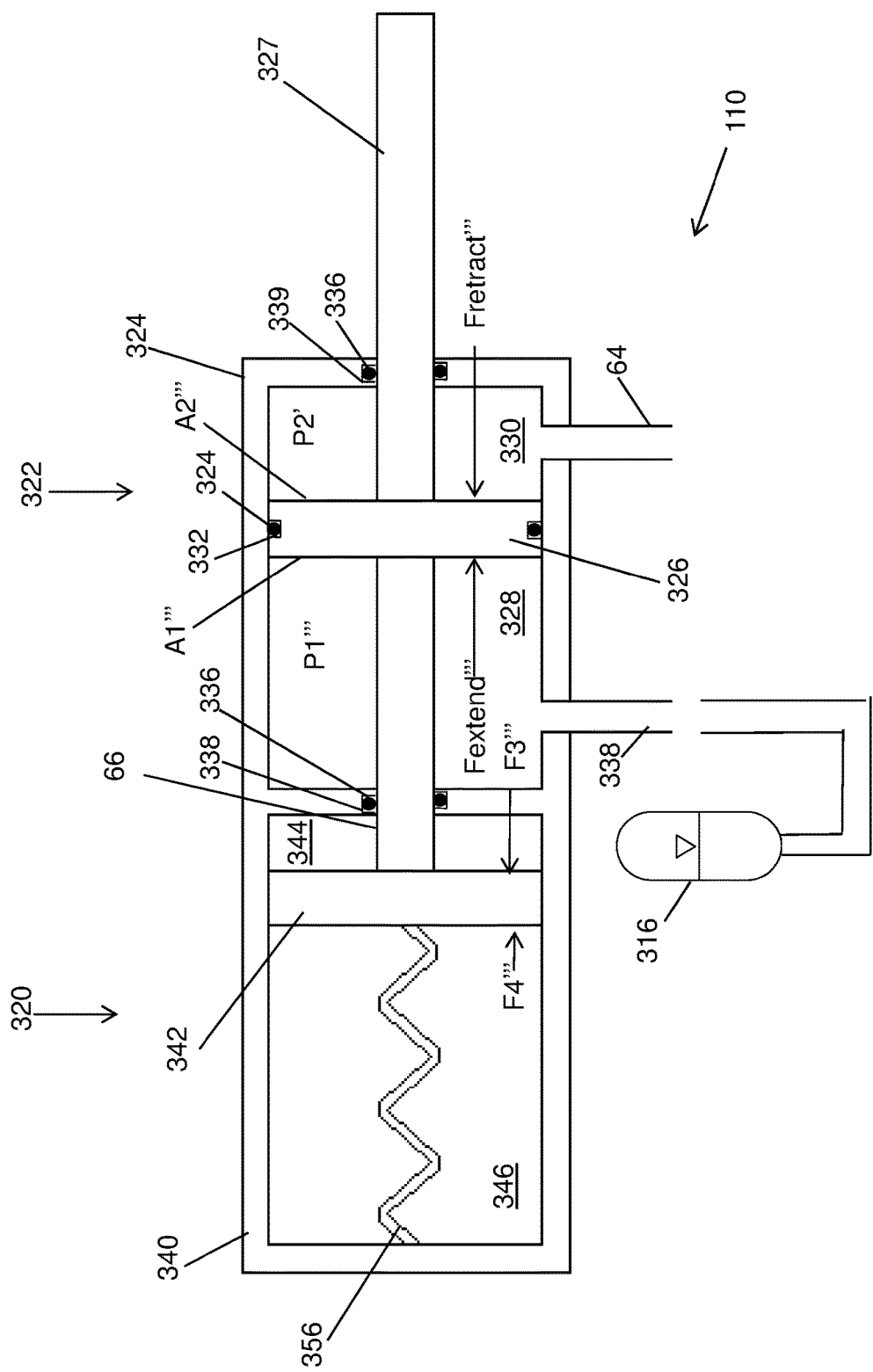
FIG. 10 shows an actuator assist apparatus for use in the system shown in FIG. 9.

For example, FIGS. 9 and 10 show an actuator system 310 according to an additional embodiment.

The actuator system 310 is similar to the actuator system 10 described above and like components are represented by like numerals incremented by 300.

As in the system 10, the system 310 comprises a hydraulic fluid supply 312, a non-return valve 314, an accumulator 316 (in the illustrated embodiment a bank of accumulators), a control valve assembly 318, a actuator assist apparatus 320 and one or more actuator 322 forming part of, operatively associated with, or coupled to, a tool T‴. In use, the system 310 is operable to provide hydraulic power to operate the actuator 322, the actuator assist apparatus 320 reducing the hydraulic power required from the accumulator 316 to operate the actuator 322.

Beneficially, by reducing the power required from the accumulator 316 to urge the actuator 322 towards an extended configuration, the actuator assist apparatus 320 reduces the minimum operating pressure (MOP) of the actuator 322. Embodiments of the present invention are thus particularly beneficially in marine, subsea and downhole applications which otherwise, due to external hydrostatic forces, lose accumulator efficiency due to the reduction in the ratio between the working pressure and the minimum operating pressure.

In this embodiment, however, the actuator assist apparatus 320 is configured to apply a push force on the actuator 322.

As shown in FIG. 10, the actuator 322 has a housing 324, a piston member 326 slidably disposed in the housing 324 and a piston rod 327 extending through the housing 324. The piston member 326 divides the interior of the housing 324 into a first fluid chamber 328 and a second fluid chamber 330.

In a similar construction to that described above with respect to FIGS. 1 to 4, in the system 310 shown in FIGS. 9 and 10 an annular groove 332 is formed in the piston member 326 and a seal element 334 is disposed in the groove 332. In use, the piston member 326 isolates the first fluid chamber 328 from the second fluid chamber 330. In the illustrated embodiment, the seal element 334 comprises an o-ring seal element. However, it will be recognized that other suitable sealing arrangements may be used to isolate the first fluid chamber 128 from the second fluid chamber 130, or no seal arrangement may be provided. Gland seals 336 are disposed in respective grooves 339 formed in the housing 324.

As shown in FIGS. 9 and 10, the first fluid chamber 328 communicates with the fluid supply 312 and the accumulators 316 via conduits 338, in the illustrated system 310 the conduits 338 taking the form of hydraulic lines. The second fluid chamber 330—rather than communicating with the actuator assist apparatus 320—communicates with the fluid supply via conduit 64, in the illustrated embodiment the conduit 64 taking the form of a hydraulic line.

In use, the actuator 322 is moveable between a retracted configuration and an extended configuration by virtue of a differential pressure force Fdelta‴ acting on the piston member 326, where the differential pressure force Fdelta‴ equals the difference between a force Fextend‴ urging the actuator 322 towards the extended configuration and which results from the fluid pressure P1‴ in the first fluid chamber 328 multiplied by annular area A1″ of the piston member 326 exposed to the pressure P1″ and a force Fretract‴ urging the actuator 322 towards the retracted configuration and which results from the fluid pressure P2‴ in the second fluid chamber 330 multiplied by annular area A2‴ of the piston member 326 exposed to the pressure P2″.

In this embodiment, the differential pressure force Fdelta‴ acting on the piston member 326 can thus be expressed as:

$$F\text{delta}'''=F\text{extend}'''-F\text{retract}''', \text{ where } F\text{extend}'''=P1'''/A1''', F\text{retract}'''=P2'''/A2'''$$

In this embodiment, the actuator assist apparatus 320 has a housing 340 which is coupled to or integral to the housing 324 and a piston member 342 slidably disposed in the housing 340. The piston member 342 divides the interior of the housing 340 into a first fluid chamber 344 and a second fluid chamber 346.

In use, the piston member 342 isolates the first fluid chamber 344 from the second fluid chamber 346.

As in the first embodiment shown in FIGS. 1 to 4, the actuator assist apparatus 320 is coupled to the actuator 322. However, in the system 310 the actuator assist apparatus 320 is coupled to the actuator 322 via a piston rod 66, the piston rod 66 coupled between the piston member 342 of the actuator assist apparatus 320 and the piston member 326 of the actuator 322.

As shown in FIG. 10, the actuator assist apparatus 320 further comprises a force applicator 356, the force applicator 356 comprising a coil spring, although other force application arrangements may be utilized where appropriate. In the illustrated embodiment, the force applicator 356 is disposed in the second fluid chamber 346 of the actuator assist apparatus 320 and is coupled at a first end to the piston member 342 of the actuator assist apparatus 320 and at a second end to the housing 340 of the actuator assist apparatus 320. The force applicator 356 is biased towards an extended position and so biases the actuator assist apparatus 320 towards an activated configuration.

The actuator assist apparatus 320 is configurable between a first, primed, configuration and an activated configuration, movement of the actuator assist apparatus 320 to the activated configuration applying a mechanical push force on the piston member 326 of the actuator 322, increasing the force Fextend''' urging the actuator 322 towards the extended configuration and thereby reducing the supply pressure P1''' required to move the actuator 322 to the extended configuration.

In operation, the system 310 is first primed by moving the actuator 322 to the retracted configuration and moving the actuator assist apparatus 320 to the primed configuration. This is achieved by reducing/venting the supply pressure P1''' in the first fluid chamber 328 of the actuator 322 and/or increasing the pressure P2''' in the second fluid chamber 330, causing the piston member 326 of the actuator 322 and the connected piston member 342 of the actuator assist apparatus 320 to move. Movement of the piston member 342 compresses the force applicator 356.

When a command to move the actuator 322 to the extended configuration is initiated, the supply pressure P2''' in the fluid chamber 328 is reduced or vented. As the pressure P2''' reduces, the force F3''' exerted on the piston member 342 and which acts to maintain the actuator assist apparatus 320 in the primed configuration reduces until it is drops below the force F4''' exerted by the force applicator 356, moving the piston member 342 to the activated configuration, the piston member 342 urging the actuator 322 towards the extended configuration.

Embodiments may be utilized in a variety of different tools and equipment, including safety heads, valves (in particular but not exclusively subsea valves), linear rod pump (LRP), Emergency Disconnect (EDP), blow out preventers and the like.

Figure 11:
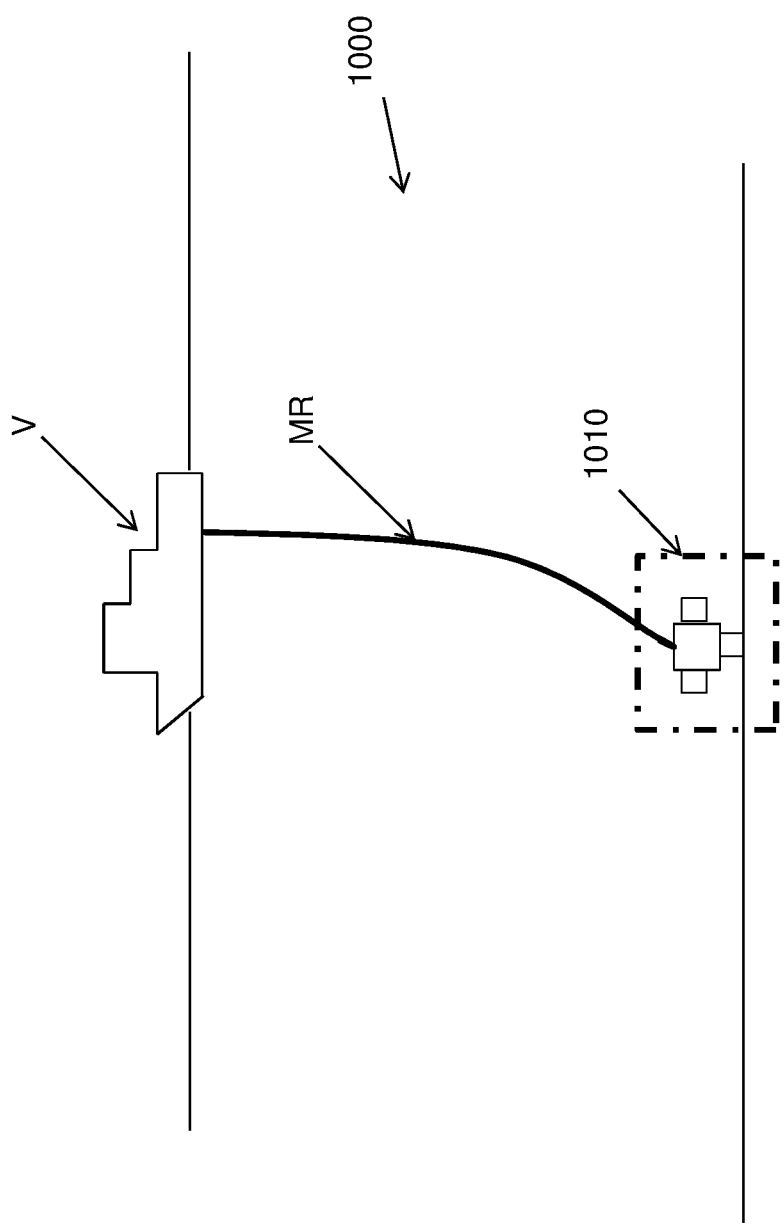
FIGS. 11 and 12 show a subsea system in which embodiments may be employed.
Figure 12:
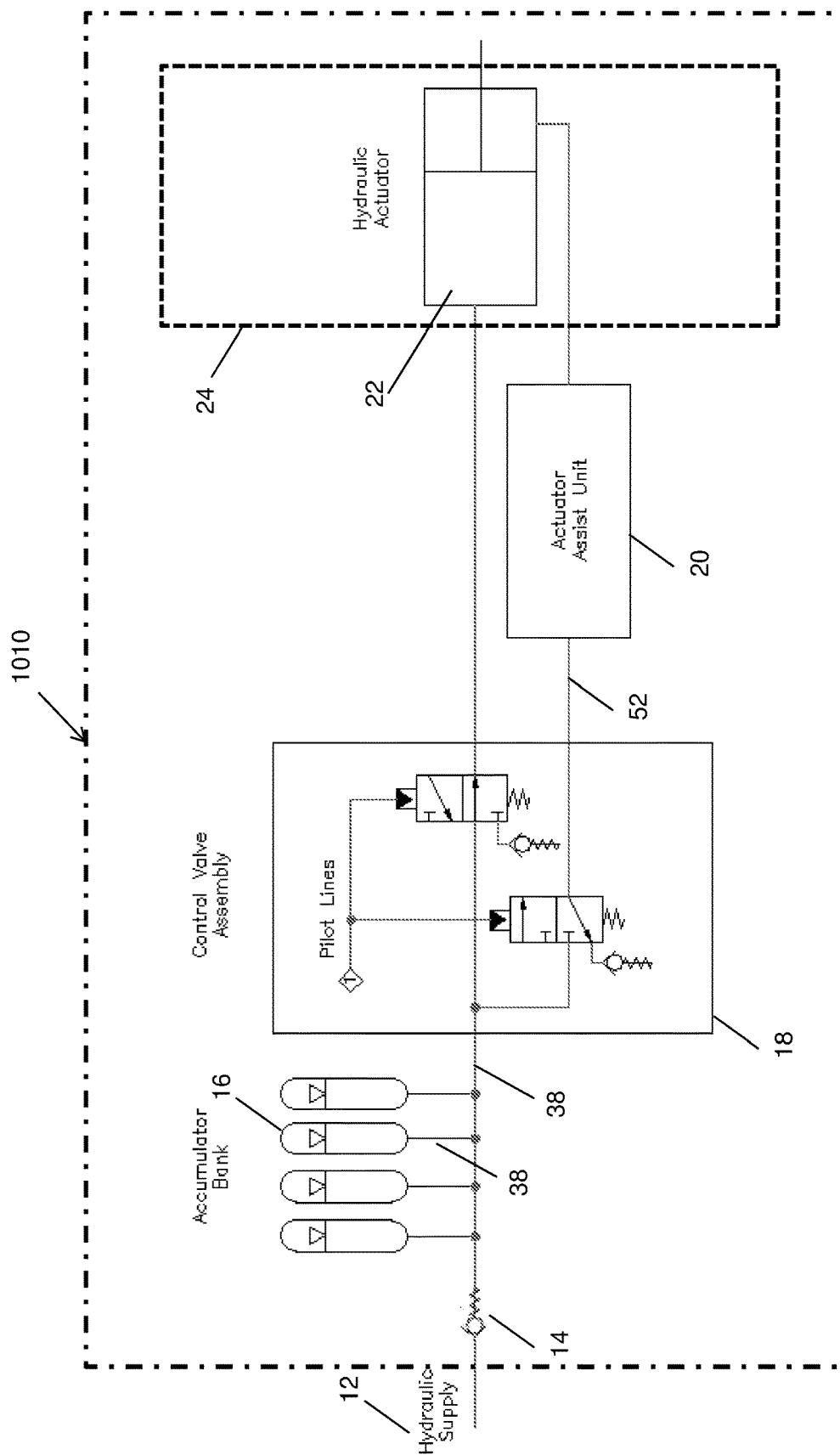

FIGS. 11 and 12 show a subsea system 1000 in which embodiments may be employed.

As shown in FIG. 11, the subsea system 1000 comprises an actuator system 1010 and in the illustrated embodiment the actuator system 1010 is substantially identical to the actuator system 10, although it will be recognized that the subsea system 1000 may alternatively or additionally comprise an actuator system corresponding to the actuator system 110, 210, and/or 310.

As shown in FIG. 11, the system 1010 comprises a marine riser MR which couples the system 1010 to a surface vessel V.

In use, the system 1000 may comprise a variety of different tools and equipment, including a safety head, a valve (in particular but not exclusively a subsea valve), a lower riser package (LRP), such as a lower marine riser package (LMRP), an Emergency Disconnect (EDP), a blow out preventer (BOP), a subsea tree, such as a subsea test tree (SSTT), a manifold, a landing string, a linear rod pump (LRP), or the like.

Figure 15:
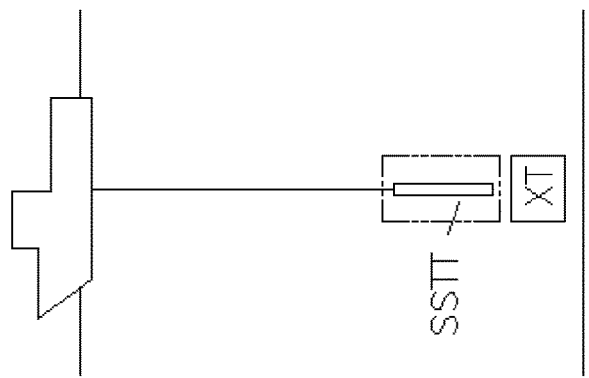
FIGS. 13, 14 and 15 show examples of tools and equipment which may be utilized in the subsea system shown in FIGS. 11 and 12.
Figure 14:
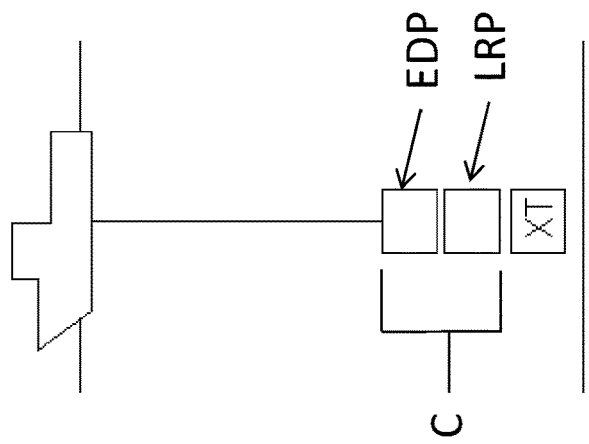
Figure 13:
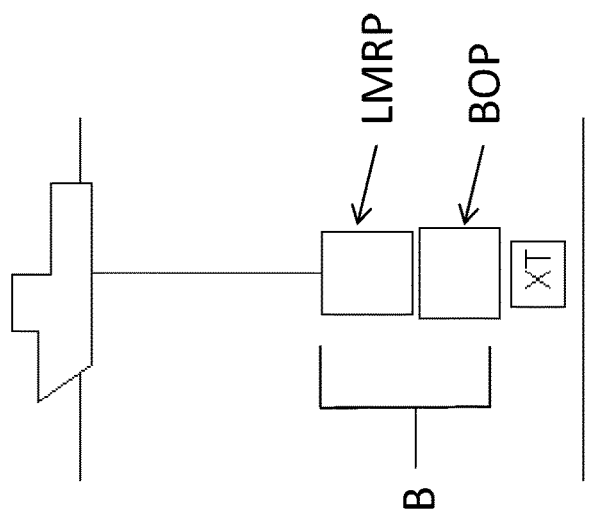

FIGS. 13, 14 and 15 show examples of tools and equipment which may form part of the system 1000 and in which the actuator system 1010 may be employed. In the embodiment shown in FIG. 13, the system 1000 comprises a wellhead assembly comprising a Christmas tree XT, and a BOP stack B comprising a blow out preventer BOP and lower marine riser package LMRP. In the embodiment shown in FIG. 14, the system 1000 comprises a wellhead assembly comprising a Christmas tree XT, and a completion workover riser system C comprising a lower riser package LRP and energy disconnect package EDP. In the embodiment shown in FIG. 15, the system 1000 comprises a wellhead assembly comprising a Christmas tree XT and a subsea test tree SSTT.

As described above, it should be understood that the embodiments described herein are merely exemplary and that various modifications may be made thereto without departing from the scope of the invention.

While in the embodiments described above, the force applicator comprises a spring or spring arrangement, other mechanisms for priming the actuator assist apparatus may be utilized, including for example but not exclusively compressed gas, rapid gas expansion, electrical energy, sea water storage.

While the embodiments described above illustrate a passive system where the actuator assist apparatus is configured to always operate when the actuator is functioned, it is envisaged that alternate control logic can be utilized to allow the actuator assist apparatus to function under specific scenarios, for example but not exclusively during an emergency shutdown procedure.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

What is claimed is:

1. An actuator assist apparatus for use with an actuator, the actuator assist apparatus comprising:
a housing;
a piston member moveably disposed in the housing;

a force application arrangement operatively associated with the piston member, the force application arrangement configured to release energy to move the piston member relative to the housing, movement of the piston member applying a force which assists in urging the actuator towards an extended configuration; and a piston rod configured to engage the actuator to apply the force to the actuator which assists in urging the actuator to the extended configuration.

2. The apparatus of claim 1, wherein the apparatus is configured to exert a force on a piston member of the actuator such that the force required by the actuator to move towards the extended configuration is reduced.

3. The apparatus of claim 2, wherein the apparatus is configured to pull fluid from the actuator such that the force required by the actuator to move towards the extended configuration is reduced.

4. The apparatus of claim 2, wherein the apparatus is configured to apply a push force on the piston member of the actuator such that the force required by the actuator to move towards the extended configuration is reduced.

5. The apparatus of claim 4, wherein the piston member is coupled to the piston member of the actuator, movement of the piston member urging the actuator to the extended configuration.

6. The apparatus of claim 1, wherein the apparatus is configurable between a first, primed, configuration and a second, activated, configuration.

7. The apparatus of claim 6, wherein, in the first, primed, configuration the force application arrangement stores the energy to be released to move the piston member relative to the housing and wherein, in moving from the primed configuration to the activated configuration, the force application arrangement releases the stored energy to move the piston member.

8. The apparatus of claim 1, further comprising a first fluid chamber and a second fluid chamber.

9. The apparatus of claim 8, wherein fluid pressure in the first fluid chamber urges the apparatus towards a first, primed, configuration and wherein fluid in the second fluid chamber urges the apparatus towards a activated configuration.

10. The apparatus of claim 8, wherein the second fluid chamber communicates with a fluid chamber of the actuator.

11. The apparatus of claim 1, wherein the force application arrangement comprises a biasing member.

12. The apparatus of claim 1, wherein the force application arrangement comprises a spring arrangement.

13. The apparatus of claim 1, wherein the force application arrangement is disposed in the housing.

14. The apparatus of claim 1, wherein the force application arrangement is disposed outwith the housing.

15. The apparatus of claim 1, wherein the force application arrangement is disposed in a third chamber, wherein the third chamber comprises an isolated fluid chamber.

16. An actuator system comprising:
an actuator for use in performing an operation; and
an actuator assist apparatus comprising
   a housing;
   a piston member moveably disposed in the housing;
   a force application arrangement operatively associated with the piston member, the force application arrangement configured to release energy to move the piston member relative to the housing, movement of the piston member applying a force which assists in urging the actuator towards an extended configuration; and
   a piston rod configured to engage the actuator to apply the force to the actuator which assists in urging the actuator to the extended configuration.

17. The apparatus of claim 16, wherein the system is configured to exert a force on a piston member of the actuator such that the force required by the actuator to move towards the extended configuration is reduced.

18. An actuation method comprising:
providing an actuator assist apparatus comprising: a housing; a piston member moveably disposed in the housing; a force application arrangement operatively associated with the piston member, and a piston rod, the force application arrangement configured to release energy to move the piston member relative to the housing;
coupling the actuator assist apparatus to an actuator; and
activating the actuator assist apparatus by releasing energy from the force application arrangement to move the piston member relative to the housing, movement of the piston member applying a force which assists in urging the actuator towards an extended configuration and the piston rod engaging the actuator to apply the force to the actuator which assists in urging the actuator to the extended configuration.

19. The method of claim 18, wherein activating the apparatus comprises reducing a supply pressure to the apparatus.

20. The method of claim 18, further comprising moving the apparatus from a first, primed, configuration to a second, activated, configuration, wherein the force application arrangement defines a retracted configuration when the apparatus is configured in the primed configuration and wherein the force application arrangement moves to an extended configuration when the activated configuration moves from the primed configuration to the activated configuration.

* * * * *